United States Patent
Purcell et al.

(10) Patent No.: US 6,718,412 B2
(45) Date of Patent: Apr. 6, 2004

(54) APPARATUS AND METHOD FOR UNIVERSAL SERIAL BUS COMMUNICATIONS

(75) Inventors: Raymond A. Purcell, Fort Collins, CO (US); Stephen F. Bayless, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 531 days.

(21) Appl. No.: 09/738,662

(22) Filed: Dec. 14, 2000

(65) Prior Publication Data

US 2002/0078283 A1 Jun. 20, 2002

(51) Int. Cl.[7] ............................................... G06F 13/00
(52) U.S. Cl. ........................... 710/109; 710/46; 710/47; 710/48
(58) Field of Search ............................. 710/47, 48, 46, 710/109

(56) References Cited

U.S. PATENT DOCUMENTS

| | | | | |
|---|---|---|---|---|
| 6,085,156 A | * | 7/2000 | Rust et al. ..................... | 702/91 |
| 6,122,676 A | * | 9/2000 | Brief et al. ..................... | 710/9 |
| 6,157,975 A | * | 12/2000 | Brief et al. ..................... | 710/104 |
| 6,173,355 B1 | * | 1/2001 | Falik et al. .................... | 710/310 |
| 6,205,501 B1 | * | 3/2001 | Brief et al. ................. | 710/100 |
| 6,272,499 B1 | * | 8/2001 | Wooten ....................... | 707/102 |
| 6,311,294 B1 | * | 10/2001 | Larky et al. .................. | 714/44 |
| 6,523,081 B1 | * | 2/2003 | Karlsson et al. ............ | 710/305 |

FOREIGN PATENT DOCUMENTS

| JP | 08202442 A | * | 8/1996 | ........... G05B/23/02 |
|---|---|---|---|---|
| JP | 10275165 A | * | 10/1998 | ........... G06F/17/40 |

OTHER PUBLICATIONS

Purcell, A., "The Search for a GPIB Replacement," Aug. 30–Sep. 2, 1999, IEEE Systems Readiness Technology Conference, pp. 169–177.*

"Converter Lets PCs Use Firewire to Talk to IEEE 488 Instruments," Jul. 16, 1998, EDN, p. 11.*

* cited by examiner

Primary Examiner—Xuan M. Thai
Assistant Examiner—Donna K. Mason

(57) ABSTRACT

An apparatus and method for communicating between a controller and a message processing device over a universal serial bus (USB). The apparatus may comprise an interface having a bulk data-out endpoint for receiving a data-out packet from the controller that requests data from the device. The interface also has an interrupt-in endpoint for receiving interrupt-in packets from the controller requesting a status of the requested data from the device. When the requested data becomes available, logic at the interface transmits the status from the interrupt-in endpoint to the controller. In addition, when USB bandwidth so permits, logic at the interface also transmits the data with the status from the interrupt-in endpoint to the controller. Alternatively, where the data is not transmitted with the status, upon receiving the status the controller queries the interface at a bulk data-in endpoint for the requested data. The device responds through logic at the interface by transmitting the data from the bulk data-in endpoint to the controller in response to the query. The interface may also comprise a bidirectional control endpoint for communicating control signals (e.g., device clear) between the device and the controller.

20 Claims, 7 Drawing Sheets

APPARATUS AND METHOD FOR UNIVERSAL SERIAL BUS COMMUNICATIONS

FIELD OF THE INVENTION

The invention pertains to an apparatus and method for communicating between a controller and a message processing device over a Universal Serial Bus (USB).

BACKGROUND OF THE INVENTION

Peripheral devices are linked to a controller (e.g., a personal computer) using various connections and communication protocols. Examples include a printer linked via a parallel port, a personal computer mouse linked via a serial port, a modem linked via a card slot (e.g., PCI, PCMCIA), etc. Likewise, many test and measurement devices link to a controller using a General Purpose Interface Bus (GPIB).

According to industry standards (e.g., IEEE 488.1, IEEE 488.2, IEC 60625.1, etc.), the GPIB is a sixteen line, bit parallel, byte serial bus. The GPIB has eight data input/output (DIO) lines, three handshake lines for reliable data transfer, and five lines for interface management (i.e., REN, ATN, IFC, SRQ, and EOI). The attention (ATN) line distinguishes between device data (e.g., programming commands and measurement results) and out-of-band messages (e.g., serial poll, device clear, etc.).

More recently, the USB was developed to provide a standard, easy-to-use connection for up to 127 devices, with each device sharing the available twelve megabits per second of bandwidth. However, the USB cable has only two wires for power (+5 volts and ground) and a twisted pair of wires to carry the data. As such, the USB cable does not offer the flexibility of dedicated lines provided by the GPIB. Instead, the USB bandwidth is managed by the controller as frames (i.e., data transferred per specified time). During a one millisecond USB frame, isochronous and interrupt signals have guaranteed bandwidth and bulk and control transfers use the leftover bandwidth, if any.

According to one USB protocol for communicating with a device, a bulk data-out packet is transmitted from the controller requesting data (e.g., a voltmeter reading) from the device. The controller then continues to send bulk data-in packets, requesting the data, to the device. These bulk data-in requests are not acknowledged by the device (i.e., return with no payload) until the requested data is available, at which point the requested data is transmitted to the controller.

The controller, operating according to the above-described USB protocol, incurs overhead by setting up and sending the bulk data-in packets. In addition, when scheduling the bulk data-in transactions, the controller must anticipate that the device will return a full USB data payload, therefore consuming USB bandwidth. Furthermore, the scheduling of data-in packets is not deterministic. That is, the USB places the lowest priority on bulk data transfers. Thus, the bulk data-in packets may be delayed by higher priority USB transactions (e.g., interrupt or control transfers).

SUMMARY OF THE INVENTION

The inventors have devised an apparatus and method for communicating between a controller and a message processing device over a USB.

One embodiment of the apparatus comprises an interface for communicating between a message processing device and the controller over the USB. The interface comprises a bulk data-out endpoint for receiving a data-out packet from the controller that requests data from the device. The interface also comprises an interrupt-in endpoint. The interrupt-in endpoint receives interrupt-in packets from the controller. The interrupt-in packets are requests for the status of the data that has been requested from the device. When the requested data becomes available, logic at the interface transmits the status from the interrupt-in endpoint to the controller. In addition, when USB bandwidth so permits, logic at the interface also transmits the data with the status from the interrupt-in endpoint to the controller. Alternatively, where the data is not transmitted with the status, upon receiving the status the controller queries the interface at a bulk data-in endpoint for the requested data. The device responds through logic at the interface by transmitting the data from the bulk data-in endpoint to the controller in response to the query. The interface may also comprise a bidirectional control endpoint for communicating control signals (e.g., device clear) between the device and the controller.

Another embodiment comprises an apparatus for communicating between a GPIB message processing device and the controller by sending GPIB signals over the USB. The apparatus comprises a bulk data-out endpoint and logic for receiving a GPIB in-band message at the bulk data-out endpoint via the USB. The apparatus further comprises an interrupt-in endpoint and logic for receiving a GPIB out-of-band message at the interrupt-in endpoint via the USB. The GPIB out-of-band message requests a status from the device, and indeed, may do so until the status is received. That is, a poll interval, which can be read by the computer during enumeration (i.e., USB configuration) of the device, is used to determine a frequency for transmitting a USB packet to the interrupt-in endpoint. In response, a GPIB status byte including the requested status is sent from the interrupt-in endpoint via the USB to the controller. Once the status is received by the controller, the controller queries the device with a GPIB in-band message sent to the bulk data-in endpoint at the device via the USB. Again, the apparatus may include a bidirectional control endpoint and logic for sending and receiving a GPIB out-of-band message at the bidirectional control endpoint via the USB. Alternatively, the apparatus may further comprise logic for sending a GPIB in-band message from the interrupt-in endpoint when USB bandwidth allocated to the interrupt-in endpoint so permits.

A method for communicating between a controller and a device over the USB may comprise requesting data from the device over the USB via a bulk data-out packet transmitted from the controller to a bulk data-out endpoint of the device. Subsequently, the device is polled for a status of the requested data over an interrupt-in pipe of the USB. Preferably, the device polling is at a regular frequency until the status and the requested data are received at the controller. That is, in response to the polling, the requested data is received at the controller over the interrupt-in pipe in a single transmission via the USB from an interrupt-in endpoint of the device. The method may further comprise transmitting control signals between the controller and the device via a bidirectional control endpoint.

Alternative embodiments of the method for communicating GPIB signals between the controller and the device via the USB may comprise requesting data from the device over the USB with a data-out packet transmitted via the USB from the controller to a bulk data-out endpoint of the device. Subsequently, the device is polled for a status of the requested data over an interrupt-in pipe of the USB. Preferably, polling the device is with an interrupt-in packet transmitted via the USB from the controller to an interrupt-in endpoint of the device. In response to the polling, the status is received at the controller, and the controller queries the device (i.e., with a data-in packet transmitted to a bulk data-in endpoint of the device) for the requested data. In response to the query, the controller receives the requested data.

The invention minimizes the effort to modify existing controller and device software for communicating GPIB signals over the USB. That is, GPIB in-band and GPIB out-of-band messages can be transmitted to the device over the USB to specified endpoints at the device. For example, control messages are sent to a control endpoint at the device, and status requests are sent to an interrupt-in endpoint at the device. In addition, communication according to the teachings of the invention conserves the availability of USB bandwidth by using interrupt transfers as opposed to bulk transfers to obtain the status of the requested data. Bulk transfers of the requested data are only required where there is insufficient bandwidth available on the USB to return the requested data with the status via an interrupt transfer. Furthermore, the invention eliminates the overhead associated with multiple bulk transfers before the requested data is ready to be transmitted to the controller, by instead polling the device with interrupt transfers. In addition, the invention reduces the latency in obtaining responses from the device by using interrupt transfers having guaranteed bandwidth to obtain the status of the requested data from the device.

These and other important advantages of the invention will be further explained in, or will become apparent from, the accompanying description, drawings and claims.

BRIEF DESCRIPTION OF THE DRAWINGS

Illustrative and presently preferred embodiments of the invention are illustrated in the drawings in which.

DESCRIPTION OF THE PREFERRED EMBODIMENT

Figure 1:
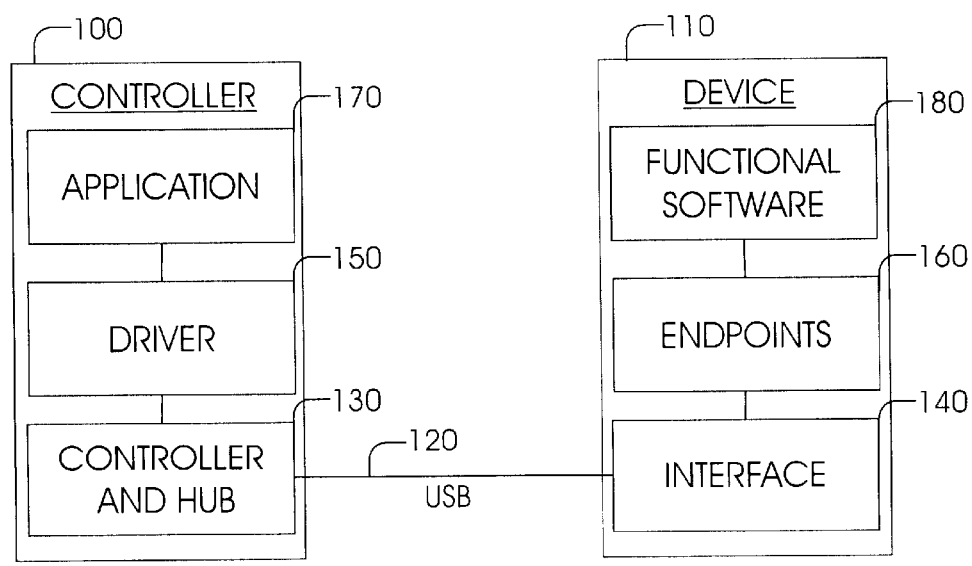
FIG. 1 is a high-level view of a controller linked to a device over a USB.

FIG. 1 is a high-level diagram illustrating the relationship of a controller 100 (e.g., a personal computer) and a message processing device 110 (e.g., an instrument such as a voltmeter) linked to one another over a Universal Serial Bus (USB) cable 120. The controller 100 is physically connected at the host controller and root hub 130 over the USB cable 120 to the device 110 at the device interface 140. The transfer of data between the controller 100 and the device 110 occurs over this physical connection via electrical signaling and packet transfer mechanisms. The controller 100 also includes drivers 150 (i.e., a USB driver and a USB host controller driver) for interfacing the application 170 (e.g., user software) with the functional aspects of the device 110 (e.g., functional software 180). For example, the drivers 150 may interface with and service the application 170, allocate USB bandwidth, configure the device 110, manage flow control between the controller 100 and the device 110, etc. In addition, the device 110 includes a collection of endpoints 160 through which the controller 100 and the device 110 communicate, as shown in FIG. 2.

It is understood that controller 100 can be any suitable controller, such as a personal computer (PC) with a PENTIUM® processor, or the like. Preferably, the message processing device 110 is a GPIB message processing device. That is, the device 110 (e.g., an instrument or measurement device, such as, an oscilloscope, spectrum analyzer, logic analyzer, etc.) is configured to send and receive GPIB-like in-band and out-of-band messages. However, it is understood that the device 110 can be any suitable hardware peripheral, including but not limited to, a speaker, storage device, etc.

Figure 2:
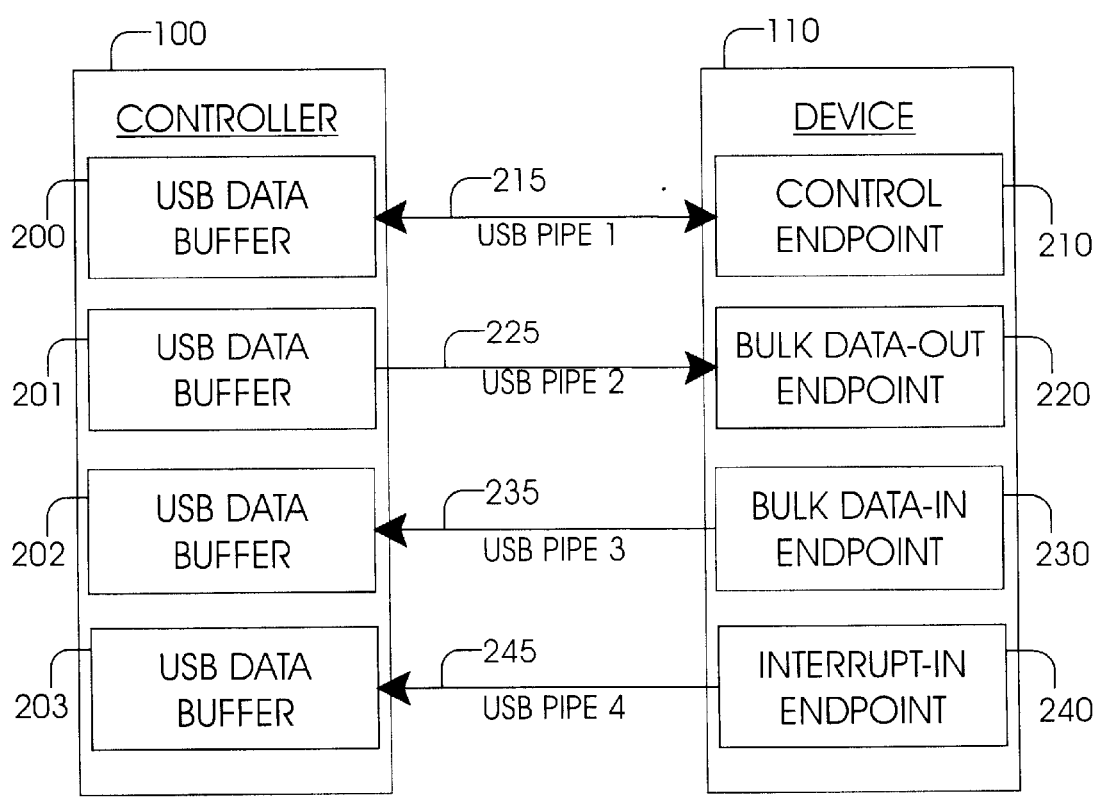
FIG. 2 illustrates communication between the controller and the device over the USB.

FIG. 2 illustrates communication between the controller 100 and the device 110 over the USB. During the configuration process, the controller 100 determines the type of endpoints 160 that the device requires (i.e., by reading descriptors associated with the device 110). An endpoint 160 is an address inside the device 110 that acts as a source and/or sink (i.e., input or output) for all USB communication flow between the controller 100 and the device 110. Each endpoint 160 is defined (i.e., using descriptors) as belonging to a specific interface type that supports a single transaction type (e.g., bulk data transfer, interrupt signals, control signals, etc.). In the embodiment shown in FIG. 2, the device 110 includes a bidirectional control endpoint 210, a bulk data-out endpoint 220, a bulk data-in endpoint 230, and an interrupt-in endpoint 240.

A GPIB device (i.e., configured to communicate with a controller via a GPIB) has individual lines for GPIB in-band messages (i.e., ATN=False) and GPIB out-of-band messages (i.e., ATN=True). However, a USB does not have dedicated lines. Therefore, according to the invention, the control endpoint 210, the bulk data-out endpoint 220, the bulk data-in endpoint 230, and the interrupt-in endpoint 240 are used to collectively communicate GPIB in-band messages and GPIB out-of-band messages between the controller 100 and the device 110.

The controller 100 establishes communication over USB pipes 215, 225, 235, and 245 with the device 110 during configuration thereof. USB pipes 215, 225, 235, and 245 are logical channels formed between endpoints 210, 220, 230, and 240 and data buffers 200, 201, 202, and 203 at the controller 100 that assume the characteristics of the associated endpoint 210, 220, 230, and 240. The USB pipes 215, 225, 235, and 245 remain inactive until the controller requests a transfer via one of the pipes 215, 225, 235, and 245. The controller 100 (i.e., driver 150) breaks up the data transfers into frames, which occur at one millisecond intervals. During each frame, time is allotted for each transaction type as follows, from highest to lowest priority: isochronous, interrupt, control, and bulk transactions.

Bulk transactions guarantee error-free delivery of data between the controller 100 and the device 110, but do not have any guaranteed bandwidth associated therewith. Thus bulk transactions use the bandwidth leftover after all of the other transaction types have been serviced. For example, where USB bandwidth is consumed by interrupt and control transfers, a bulk transfer will not be allotted bandwidth on the USB and therefore the bulk transfer will be delayed in favor of the interrupt and control transfers. Control transactions are used for short command and/or control messages (i.e., for setting and retrieving important information concerning the device 110, such as descriptors, device address, etc.). Interrupt transactions are short packets for polling the device 110, and may also include data in some embodiments of the invention explained below. The polling of the device 110 can be regularly scheduled by the controller 100, as specified during the bus enumeration. The device 110 may respond to an interrupt transaction, for example, with a data packet, a not acknowledged signal (NAK), etc.

Figure 3:
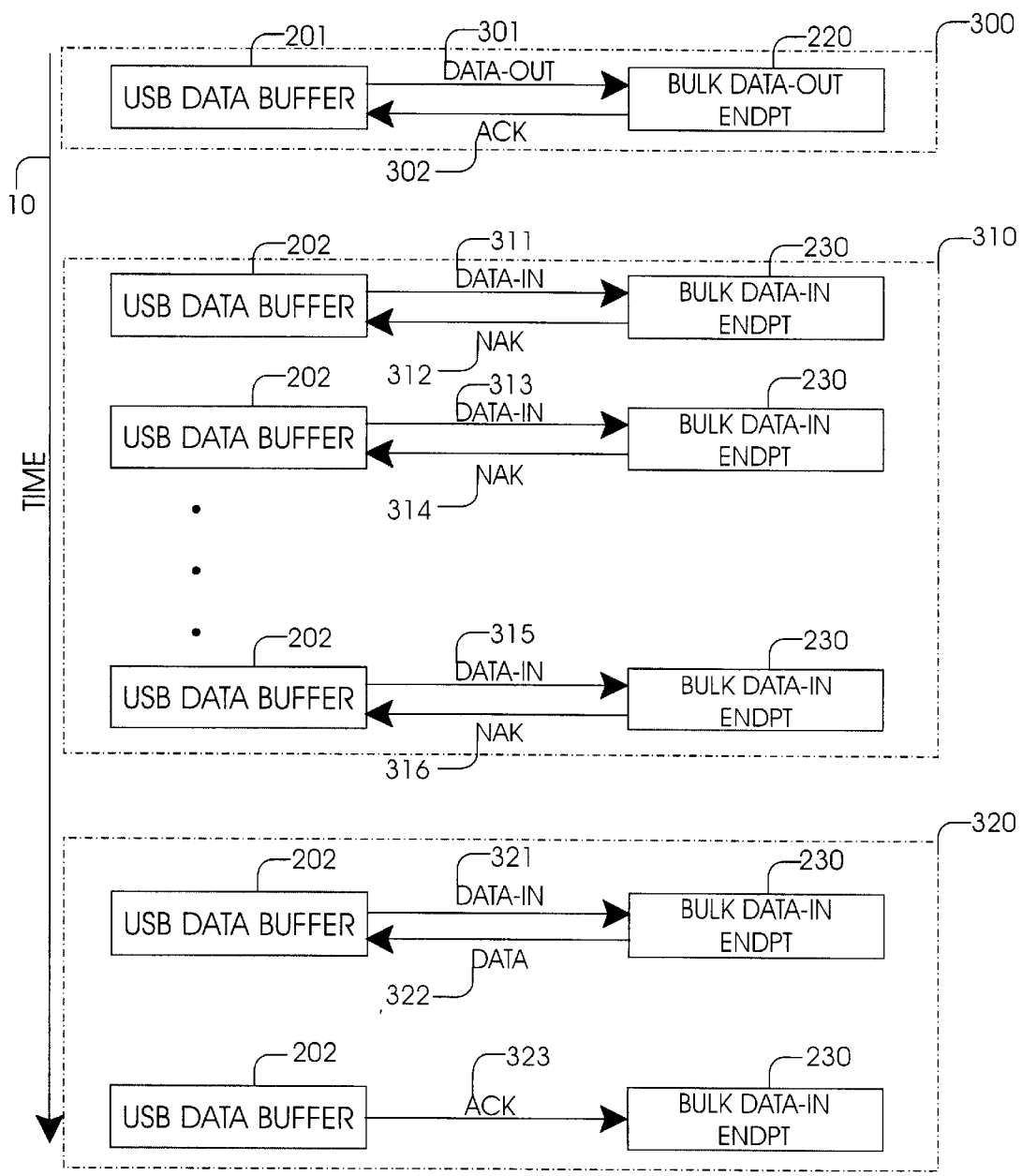
FIG. 3 illustrates one embodiment for communicating between the controller and the device over the USB as a function of time.

FIG. 3 illustrates one embodiment for communicating between the controller 100 and the device 110 over the USB as a function of time (i.e., indicated by arrow 10). During time interval 300, the controller 100 (i.e., via USB data buffer 201) transmits a bulk data-out packet 301 to a bulk data-out endpoint 220 of the device 110. The bulk data-out packet 301 requests data from the device 110. For example, the data-out packet may be a request to take and/or report a measurement such as a voltage, revolution per minute (RPM), an acquired waveform, a screen image, etc. In response, the device 110 transmits an acknowledgment 302 from the bulk data-out endpoint 220 to the controller 100 notifying the controller 100 that the transfer was received error-free. During time interval 310, the controller 100 (i.e., via USB data buffer 202) generates a bulk data-in packet 311, 313, 315 and transmits the same to the bulk data-in endpoint 230 of the device 110. However, the bulk data-in packet 311 is not acknowledged by the device 110 until the requested data becomes available. That is, a not-acknowledged signal (NAK) 312, 314, 316 is returned to the controller 100 from the bulk data-in endpoint 230 of the device 110. Thus, the controller 100 continues to generate and transmit bulk data-in packets (i.e., 313, 315, etc.) to the bulk data-in endpoint 230 of the device 110 until the requested data becomes available. Once the requested data becomes available from the device 110 (i.e., prior to time interval 320), the bulk data-in packet 321 is received at the bulk data-in endpoint 230 of the device 110 and, in response, the device 110 transmits the requested data payload 322 from the bulk data-in endpoint 230 to the controller 100 (i.e., via USB data buffer 202). After receiving the requested data payload 322, the controller 100 (i.e., via USB data buffer 202) transmits an acknowledgment (ACK) 323 to the bulk data-in endpoint 230 of the device 110.

Figure 4:
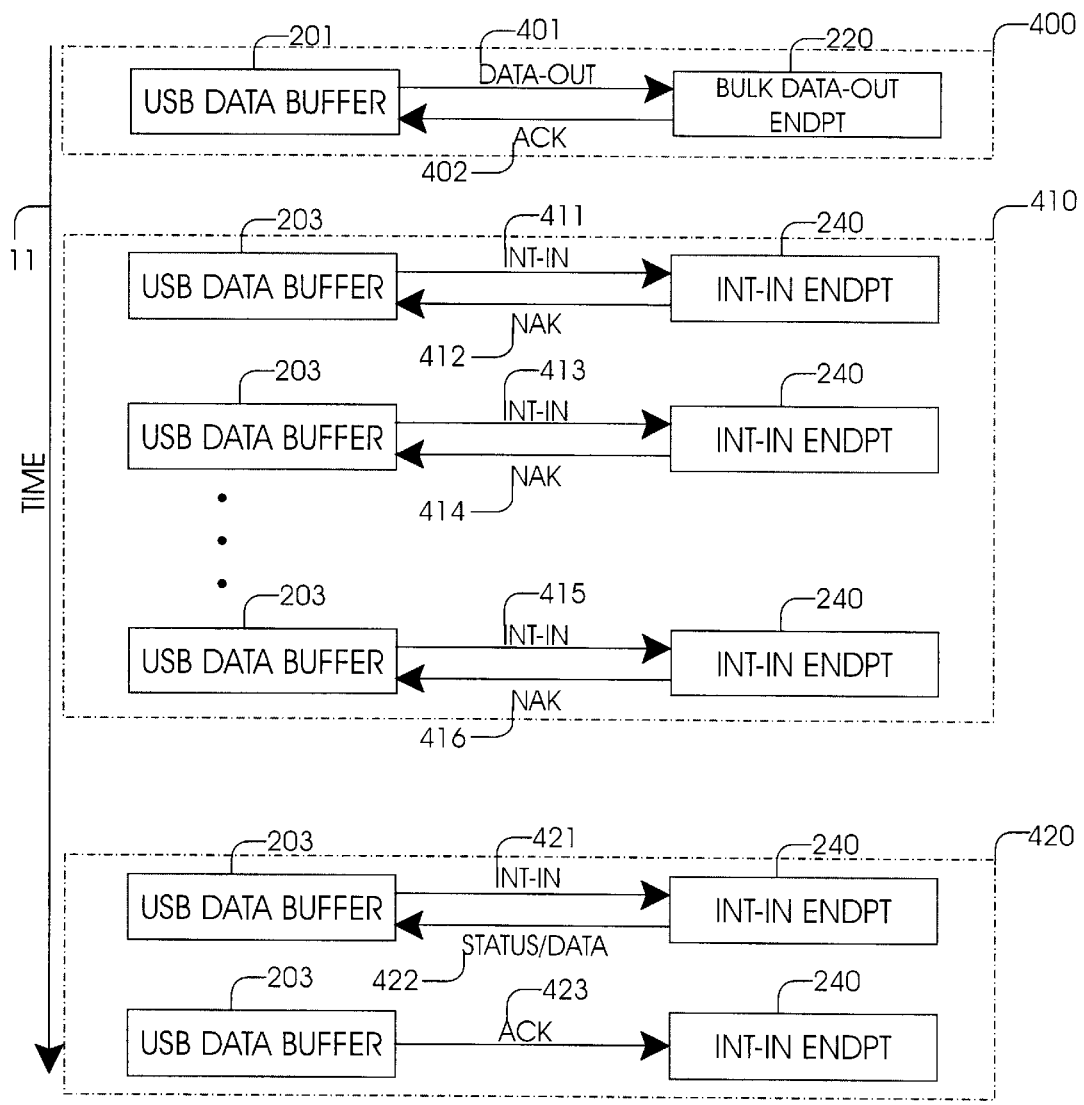
FIG. 4 illustrates another embodiment for communicating between the controller and the device over the USB as a function of time.

FIG. 4 illustrates another embodiment for communicating between the controller and the device over the USB as a function of time (i.e., as indicated by arrow 11). During time interval 400, logic at the controller 100 (i.e., via USB data buffer 201) transmits a bulk data-out packet 401 (e.g., a GPIB in-band message) to a bulk data-out endpoint 220 of the device 110. The bulk data-out packet 401 requests data from the device (e.g., voltage, RPM, etc.). In response, logic at the device 110 transmits an acknowledgment 402 from the bulk data-out endpoint 220 to the controller 100, again, indicating that the transfer was received error-free. During interval 410, logic at the controller 100 (i.e., via USB data buffer 203) generates an interrupt-in packet 411, 413, 415 (e.g., a GPIB out-of-band message) and transmits the same to the interrupt-in endpoint 240 of the device 110. The interrupt-in packet 411, 413, 415 requests a status of the requested data (i.e., requested by the bulk data-out packet 401). Again, the interrupt-in packet 411 is not acknowledged by the device 110 until the requested data becomes available (i.e., an NAK 412, 414, 416 is returned to the controller 100 from the interrupt-in endpoint 240 of the device 110). Thus, the logic at the controller 100 continues to generate and transmit interrupt-in packets (i.e., 413, 415, etc.) to the interrupt-in endpoint 240 of the device 110 until the requested data becomes available. That is, the controller 100 polls the device 110. The device 110 may control scheduling of the interrupt-in packets 411, 413, 415, which can be made to reliably occur at a known frequency. Once the requested data becomes available from the device 110 (i.e., prior to time interval 420), the interrupt-in packet 421 is received by logic at the interrupt-in endpoint 240 of the device 110. In response, and where USB bandwidth so permits, logic at the device 110 transmits a status byte and data payload 422 (e.g., a GPIB out-of-band message) from the interrupt-in endpoint 240 to the controller 100 (i.e., via USB data buffer 203). After receiving the requested status and data payload 422, logic at the controller 100 (i.e., via USB data buffer 203) transmits an ACK 423 to the interrupt-in endpoint 240 of the device 110.

The controller 100, operating according to the USB protocol described with respect to FIG. 4, uses interrupt transfers as opposed to bulk transfers (e.g., 311 in FIG. 3) and therefore does not incur the overhead in doing so. In addition, the scheduling of the interrupt transfers occur at regular intervals, as it is unlikely that the interrupt transfers will be delayed by higher priority USB tranactions.

Figure 5:
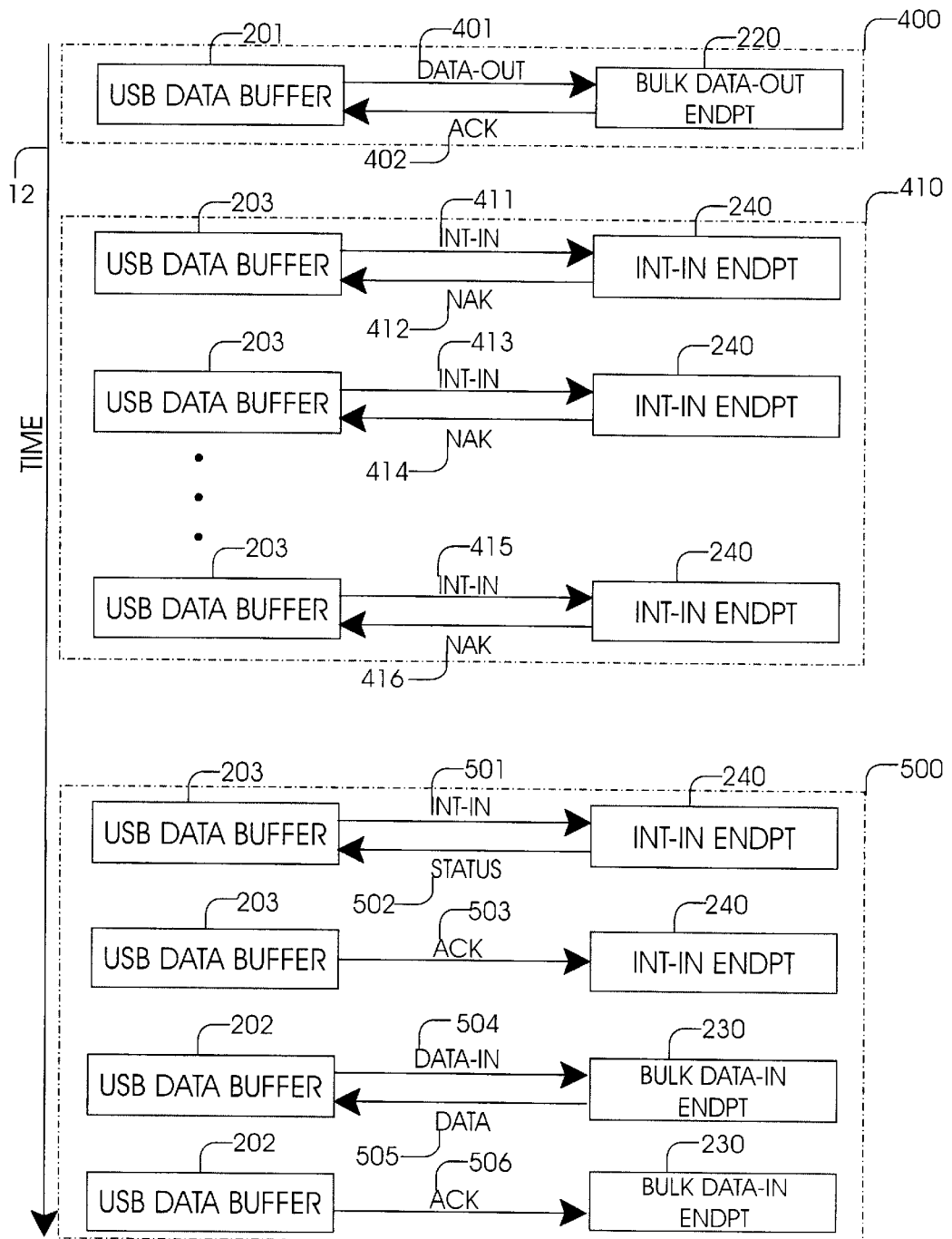
FIG. 5 illustrates yet another embodiment for communicating between the controller and the device over the USB as a function of time.

FIG. 5 illustrates yet another embodiment for communicating between the controller 100 and the device 110 over the USB as a function of time (i.e., as indicated by arrow 12). Again, the transactions that occurs between the controller 100 and the device 110 during time intervals 400 and 410 are the same as those shown and described with respect to FIG. 4. That is, during time intervals 400, logic at the controller 100 transmits a bulk-out packet 401 (e.g., a GPIB in-band message) to a bulk data-out endpoint 220 requesting data from the device 110. In turn, logic at the device 110 transmits an acknowledgment (ACK) 402 to the controller 100. During interval 410, logic at the controller 100 generates interrupt-in packets 411, 413, 415 (e.g., GPIB out-of-band messages) to poll the interrupt-in endpoint 240 of the device 110 for a status of the requested data. Again, the interrupt-in packets 411 is not acknowledged by the device 110 until the requested data becomes available. Meanwhile, logic at the controller 100 continues to generate and transmit interrupt-in packets (i.e., 413, 415, etc.) to the interrupt-in endpoint 240 of the device 110 until the requested data becomes available. However, in this embodiment, once the requested data becomes available from the device 110 (i.e., prior to time interval 500), there is insufficient bandwidth available over the USB to include the data payload with the status byte. Therefore, the interrupt-in packet 501 is received by logic at the interrupt-in endpoint 240 of the device 110 and, in response, logic at the device 110 only transmits the requested status byte 502 (e.g., a GPIB status byte) from the interrupt-in endpoint 240 to the controller 100 (i.e., via USB data buffer 203). After receiving the requested status byte 502, logic at the controller 100 acknowledges receipt of the status byte 502 (via ACK 503) and then queries the device 110 by generating a bulk data-in packet 504 (e.g., a GPIB in-band message) and transmitting the same to the bulk data-in endpoint 230 of the device 110. In response, logic at the device transmits the requestes data 505 (e.g., as a GPIB in-band message) to the controller 100 from the bulk data-in endpoint 230 of the device 110.

The controller 100, operating according to the USB protocol described with respect to FIG. 5, again polls the device with interrupt transfers as opposed to bulk transfers, thus not incurring the overhead required to set up and send bulk transfers. The controller 100 only sends a bulk transfer to query the device 110 once a status is received by the controller 100, indicating that the requested data is available. Likewise, the interrupt transfer can be scheduled to occur at regular intervals so that it is unlikely communication between the controller 100 and the device 110 over the USB will be delayed.

The device 110 shown in the embodiment illustrated in FIG. 4 can be any suitable message processing device. On the other hand, the device 110 shown in the embodiment illustrated in FIG. 5 is preferably a GPIB message processing device. However, it is understood that FIG. 4 and FIG. 5 are merely illustrative of various embodiments of the invention and are not intended to limit the teachings thereof. For example, in a preferred embodiment, control signals (e.g., GPIB out-of-band messages), are communicated via the control endpoint 210. For example, GPIB out-of-band messages (ATN+True) may include trigger, remote, local, selected device clear, etc.

Figure 6:
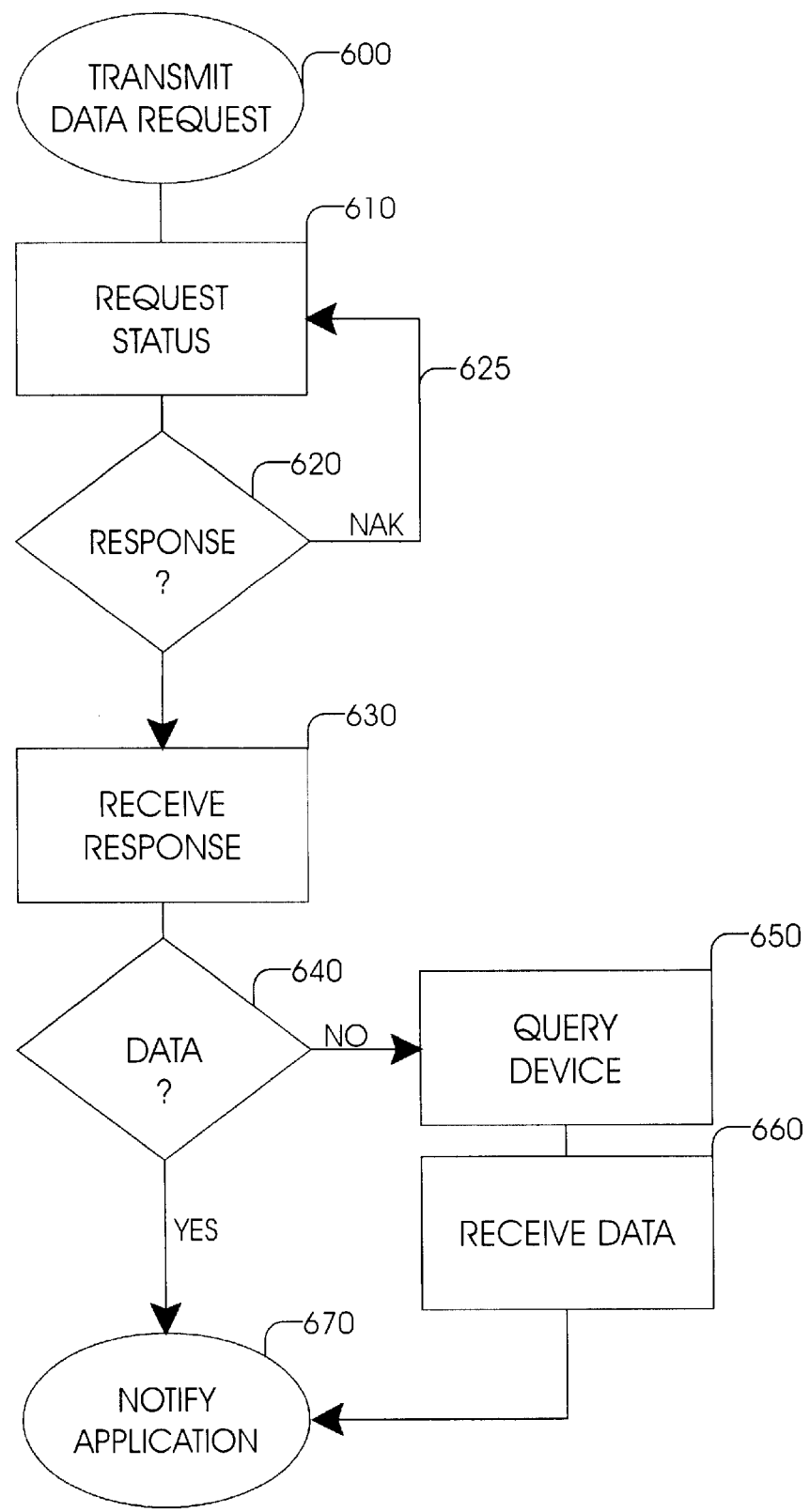
FIG. 6 shows one embodiment of a method for communicating between the controller and the device over the USB.

FIG. 6 shows one embodiment of a method for communicating between the controller 100 and the device 110 over the USB, from the perspective of the controller 100. In step 600, the controller 100 transmits a data request to the device 110. That is, the controller 100 generates and transmits a bulk data-out packet 401 via USB data buffer 201 over the USB to the bulk data-out endpoint 220 of the device 110. In step 610, the controller 100 transmits a status request to the device 110. That is, the controller 100 generates and transmits an interrupt-in packet 411 to the interrupt-in endpoint 240 of the device 110 via the USB. In step 620, the controller 100 checks whether the status request is acknowledged. Where the status request is not acknowledged (i.e., NAK 625), the controller 100 again requests the status of the requested data from the device 110 in step 610. The controller 100 continues to poll the device 110 (i.e., with interrupt-in packets 413, 415, etc.) until the controller 100 receives a response (i.e., other than NAK) from the device 110. When the controller 100 receives the response in step 630, the controller then checks the response for the status and the requested data in step 640. Where the response contains both the status and the requested data (e.g., status and data payload 422 in FIG. 4), the controller 100 notifies the application 170 that the requested data is ready in step 670. Alternatively, where the response contains only the status (e.g., status byte 502 in FIG. 5) in step 640, the controller 100 instead queries the device in step 650 for the requested data. That is, the controller 100 generates a bulk data-in packet 504 and transmits the same to the bulk data-in endpoint 230 of the device 110. In response to querying the device 110, the controller 100 receives the requested data in step 660 (e.g., data payload 505 in FIG. 5), and the controller 100 notifies the application that the requested data is ready in step 670.

Figure 7:
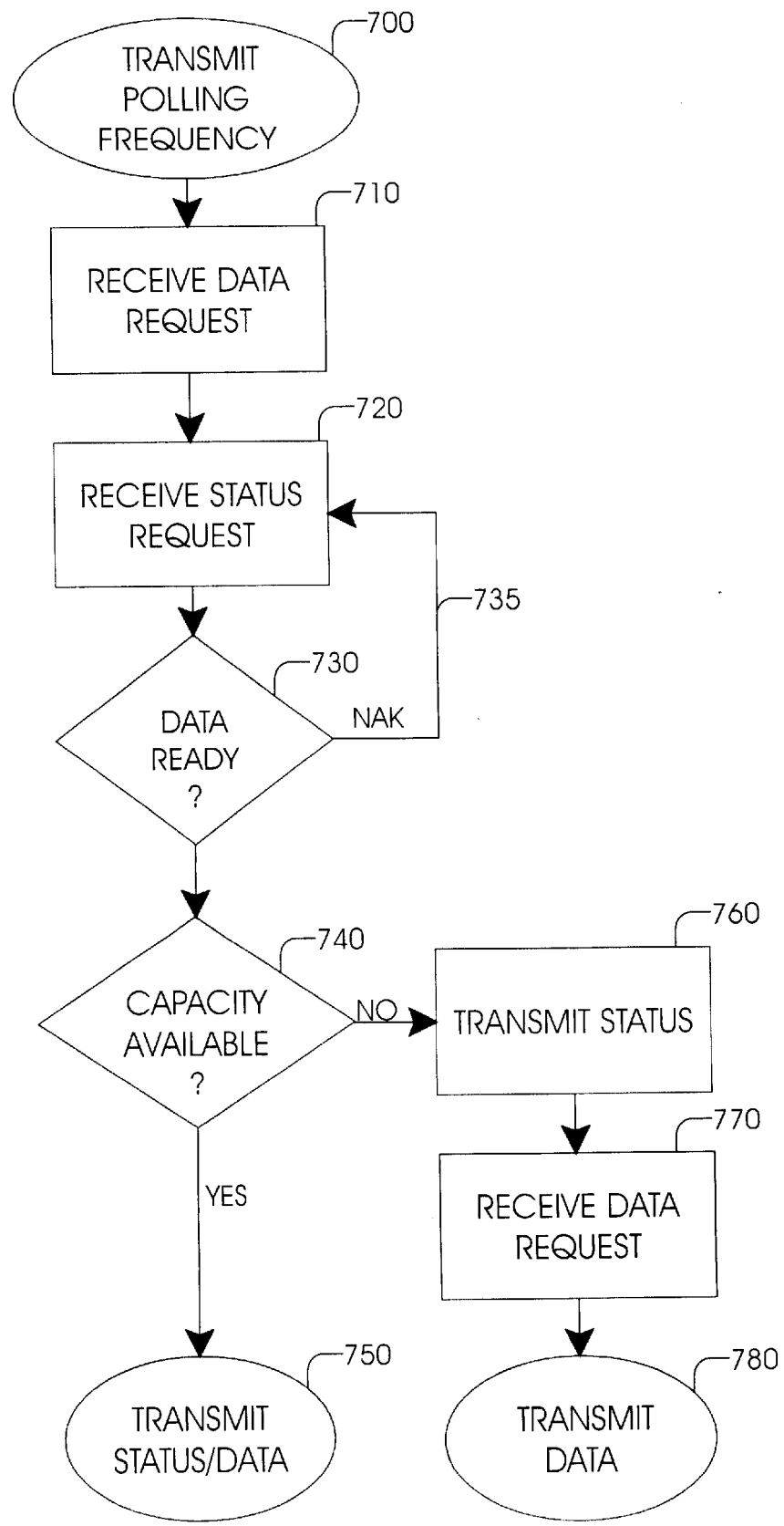
FIG. 7 shows another embodiment of a method for communicating between the controller and the device over the USB.

FIG. 7 shows another embodiment of a method for communicating between the controller and the device 110 over the USB, from the perspective of the device 110. In step 700 (i.e., during enumeration of the device 110), the device 110 transmits a polling frequency to the controller 100. In step 710 (i.e., during execution of application 170), the device 110 receives a data request from the controller 100. That is, the device 110 receives a bulk data-out packet 401 via USB data buffer 201 at the bulk data-out endpoint 220 of the device 110. In step 720, the device 110 receives a status request. That is, the device receives an interrupt-in packet 411 at the interrupt-in endpoint 240 of the device 110 from the controller 100 via the USB. In step 730, the device 110 checks whether the requested data is available. Where the requested data is not available, the device 110 transmits 735 an NAK 625 to the controller 100. The device 110 continues to receive status requests from the controller 100 (i.e., interrupt-in packets 413, 415, etc.) until the requested data is ready. When the data is ready, the device 110 checks in step 740 whether there is sufficient USB bandwidth to include the data payload with the status byte (i.e., as an interrupt transfer). Where there is sufficient USB bandwidth, the device 110 transmits both the status byte and the requested data to the controller 100 in step 750 (e.g., as interrupt transfer 422 in FIG. 4). Alternatively, where there is insufficient USB bandwidth to include the requested data with the status, the device 110 transmits only the status byte to the controller 100 in step 760 (i.e., from interrupt-in endpoint 240 via transfer 502 in FIG. 5). In step 770, the device 110 receives a data request. For example, the device 110 receives a bulk data-in packet 504 (FIG. 5) querying the device 110 for the requested data at the bulk data-in endpoint 230. In response the device 110 transmits the requested data in step 780. For example, the device 110 transmits the data payload 505 (FIG. 5) from the bulk-in endpoint 230 of the device 110.

It is understood that the steps shown in FIG. 6 and FIG. 7 are merely illustrative of embodiments of a method for communicating between the controller 100 and the device 110 over a USB, and that other embodiments are contemplated as being within the scope of the invention. In another embodiment, additional steps may include the controller 100 and the device 110 transmitting ACK and NAK therebetween as shown and described with respect to FIG. 4 and FIG. 5. Or for example, control signals can be transmitted via the bidirectional control endpoint 210. Other embodiments of the method shown in FIG. 6 and FIG. 7 will also be apparent based on the teachings of the invention and thus are also intended to be included as part of the invention.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for communicating between a controller and a message processing device over a Universal Serial Bus (USB), comprising:

requesting data from said message processing device over said USB;

subsequently polling said message processing device for a status of said requested data over an interrupt-in pipe of said USB; and in response to said polling, receiving said status and said requested data over said interrupt-in pipe in a single transmission at said controller.

2. A method as in claim 1, wherein said message processing device polling is at a regular frequency until said status and said requested data are received at said controller.

3. A method as in claim 1, wherein said status and said requested data are received via said USB from an interrupt-in endpoint of said message processing device.

4. A method as in claim 1, wherein requesting said data is via a bulk data-out packet transmitted from said controller to a bulk data-out endpoint of said message processing device.

5. A method as in claim 1, further comprising transmitting control signals from said controller to said message processing device via a bidirectional control endpoint.

6. An interface for communicating between a message processing device and a controller over a Universal Serial Bus (USB), comprising:
- a bulk data-out endpoint for receiving a data-out packet from said controller requesting data from said message processing device;
- an interrupt-in endpoint for receiving an interrupt-in packet from said controller requesting a status of said data;
- logic for transmitting said status from said interrupt-in endpoint to said controller; and
- logic for transmitting said data with said status from said interrupt-in endpoint to said controller when USB bandwidth so permits.

7. An interface as in claim 6, further comprising a bidirectional control endpoint for communicating control signals between said message processing device and said controller.

8. An interface as in claim 6, further comprising:
- a bulk data-in endpoint for receiving a data-in packet from said controller querying said message processing device for said data; and
- logic for transmitting said data from said bulk data-in endpoint to said controller.

9. A method for communicating GPIB signals between a controller and a GPIB message processing device via a Universal Serial Bus (USB), comprising:
- requesting data from said GPIB message processing device over said USB;
- subsequently polling said GPIB message processing device for a status of said requested data over an interrupt-in pipe of said USB;
- in response to said polling, receiving said status at said controller;
- querying said GPIB message processing device for said requested data in response to said status via said USB; and
- in response to said query, receiving said requested data.

10. A method as in claim 9, wherein polling said GPIB message processing device is at a regular frequency until said status and said requested data are received.

11. A method as in claim 9, wherein polling said GPIB message processing device is with an interrupt-in packet transmitted via said USB from said controller to an interrupt-in endpoint of said GPIB message processing device.

12. A method as in claim 9, wherein requesting said data is with a data-out packet transmitted via said USB from said controller to a bulk data-out endpoint of said GPIB message processing device.

13. A method as in claim 9, wherein querying said GPIB message processing device is with a data-in packet transmitted via said USB from said controller to a bulk data-in endpoint of said GPIB message processing device.

14. An apparatus for communicating between a GPIB message processing device and a controller using GPIB signals over a Universal Serial Bus (USB), comprising:
- a bulk data-out endpoint;
- logic for receiving a first GPIB in-band message at said bulk data-out endpoint via said USB;
- an interrupt-in endpoint;
- logic for receiving a GPIB out-of-band message at said interrupt-in endpoint via said USB;
- logic for sending a GPIB status byte from said interrupt-in endpoint in response to receiving said GPIB out-of-band message via said USB;
- a bulk-data-in endpoint;
- logic for receiving a second GPIB in-band message at said bulk data-in endpoint via said USB; and
- logic for sending a third GPIB in-band message from said bulk data-in endpoint in response to receiving said second GPIB in-band message via said USB.

15. An apparatus as in claim 14, further comprising:
- a bidirectional control endpoint; and
- logic for sending and receiving a second GPIB out-of-band message at said bidirectional control endpoint via said USB.

16. An apparatus as in claim 14, further comprising logic for sending a fourth GPIB in-band message from said interrupt-in endpoint when USB bandwidth allocated to said interrupt-in endpoint so permits.

17. An apparatus as in claim 14, further comprising a poll interval which can be read by said controller during enumeration of said GPIB message processing device, said poll interval determining a frequency for transmitting GPIB out-of-band messages to said interrupt-in endpoint.

18. An apparatus as in claim 14, wherein said GPIB in-band message received at said bulk data-out endpoint requests data from said GPIB message processing device.

19. An apparatus as in claim 14, wherein said GPIB out-of-band message requests a status from said GPIB message processing device, and wherein said GPIB status byte includes said requested status.

20. An apparatus as in claim 14, wherein said second GPIB in-band message received at said bulk data-in endpoint queries said GPIB message processing device for data, and wherein said third GPIB in-band message sent in response thereto includes said data.

* * * * *